Patented Mar. 8, 1938

2,110,837

UNITED STATES PATENT OFFICE 2,110,837

PROCESS FOR BREAKING PETROLEUM EMULSIONS

Charles M. Blair, Webster Groves, Mo., assignor to The Tret-O-Lite Company, Webster Groves, Mo., a corporation of Missouri No Drawing. Application June 21, 1937, Serial No. 149,476

16 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil", and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by my process consists of or comprises an alkylated aromatic sulfonic acid in the form of a complex amine salt of the kind hereinafter described. The alkylated aromatic compounds are nuclear substituted products.

Commercial demulsifying agents employed for breaking or resolving oil field emulsions include among other substances, alkylated aromatic sulfonic acids, and particularly substituted polycyclic aromatic sulfonic acids or their salts. Although the alkylated monocyclic aromatic sulfonic acids find some application in demulsification, yet the type which finds most frequent application is obtained by introducing one, two, or more alkyl groups into a naphthalene residue and then producing the sulfonic acid. Due to the corrosiveness of the sulfonic acid, it is the usual practice to employ the reagent in the form of a salt, such as an ammonium salt, potassium salt, sodium salt, etc.

It is understood that the compounds used as demulsifying agents in the present process may be obtained from any alkylated nucleus, including such materials as toluene, xylene, ethyl benzene, trimethylbenzene, propylbenzene, cymene, etc. Such compounds may also be produced from methyl naphthalene, ethyl naphthalene, dimethyl naphthalene, and the like. I have found, however, that the most desirable reagents are produced from alkylated polycyclic aromatic compounds in which the alkyl group contains not less than three carbon atoms and not more than ten carbon atoms. For sake of brevity in the various illustrations hereinafter described, I shall refer to the use of or the preparation of compounds derived from naphthalene in which the alkyl radical contains not less than three carbon atoms and not more than ten. It is understood, however, that one may employ alkylated monocyclic compounds and also alkylated polycyclic compounds in which the alkyl group contains not more than two carbon atoms.

It is well known that if a secondary amine, particularly the kind containing less than 24 carbon atoms is condensed with a phenol and an aldehyde, there results a complex amine or a mixture of complex amines. The composition of such amine or mixture of amines is not fully understood, but apparently at least the following types of amines are present:

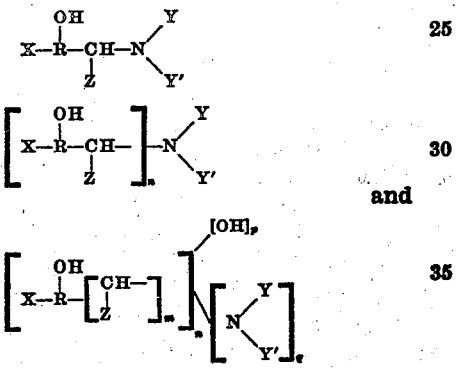

where R is the aromatic nucleus, X is a hydrogen atom or a nuclear substitutent, Z is either a hydrogen atom or the group originally attached to the —CHO group of the aldehyde and Y and Y' are the groups, other than hydrogen, originally attached to the non-aromatic secondary amine. The —CH— group is attached at a position either ortho or para to the phenolic hydroxyl, or a functionally equivalent position. $n$ and $m$ are small whole numbers, such as 1, 2, 3, 4 or 5, and less than 10, $q$ is a whole number which may have any value from 1 up to and including $[n(m-1)+1]$, and $p$ is zero or a whole number having any value up to and including $n(m-1)$, with the provision that in all cases the sum of $p$ and $q$ must total $[n(m-1)+1]$.

For the sake of convenience, these complex amines may be represented by the formula:

where T is the phenolic residue, D is the aldehydo linkage and B is the monovalent secondary amino radical. $m$ is a small whole number such as 1, 2, 3, 4 or 5, and less than 10; $n$ is a whole number having any value from $m$ to $m+10$; $p$ may be zero or any whole number up to and including $(n-m)$; $q$ may be any whole number from 1 up to and including $(n-m+1)$, with the provision that in all cases the sum of $p$ and $q$ must total $(n-m+1)$.

In addition to amines of the types above described, other complex amines or associated compounds may be present, and for this reason, as well as for convenience, the amines are advantageously described by the means of producing the same.

Phenols which may be employed to form the complex aldehydic amine may be indicated by the general formula X—R—OH, where R is an aromatic monocyclic or polycyclic nucleus having at least one free nuclear position, ortho or para to the phenolic hydroxyl group available for condensation; and X is a hydrogen atom or a nuclear substituent of R, and particularly of the type where X represents a long alkyl chain, that is, a monovalent hydrocarbon radical containing particularly six or more carbon atoms. It is understood herein that the aromatic nucleus R may contain other nuclear substituents in addition to X, such as additional hydroxyl groups, halogen atoms, or alkyl, alkoxy, nitro, amino or alkylol groups; but R should be free from acidic or acid-forming substituents, such as sulfonic, aldehydo or carboxyl groups, whose presence prevents the desired condensation from taking place. The hydrocarbon group X is a monovalent aromatic, hydroaromatic, alicyclic, or aliphatic radical, and as previously stated, preferably contains six or more carbon atoms.

Phenols, such as butylphenol, butylbromphenol, butylcresol, butylchlorphenol, butylresorcinol, butyliodophenol, butylnaphthol and their respective higher homologues, such as the corresponding amyl-, hexyl-, heptyl-, octyl-, duodecyl-, hexadecyl-, or octa-decylphenols and the corresponding cresols, hydroquinones, resorcinols, and naphthols are particularly suitable as phenolic bodies to be employed to form the demulsifying agents used in the present process. The alkyl groups in all of these phenols can be either straight-chain or branched-chain in character, and may be in either the ortho, meta, or para position to the phenolic hydroxyl group, provided a free position ortho or para to the phenolic hydroxyl group remains available for condensation. Furthermore, phenols such as cyclo hexylphenol, bornylphenol, tetrahydronaphthaylphenol, phenylphenol, benzylphenol, and their corresponding cresol, resorcinol, hydroquinone, or naphthol analogues can be used.

In producing the amine of the kind employed to combine with suitable alkylated aromatic sulfonic acids to yield a demulsifying agent of the kind employed in the present process, one may employ a phenol which contains no nuclear substituent of more than three carbon atoms; as, for instance, phenol itself (hydroxy benzene), resols, xylenols, ethyl phenol, isopropyl phenol, thymol, carvacol, resorcinol, naphthol, nitrophenol, chlorphenol, and chlorcresol. The simpler amines, which are employed to combine with a phenol and an aldehyde to form the complex amines which subsequently form the alkylated aromatic sulfonic acid salt, or the strongly basic non-aromatic amines, and have the general formula type R—NH—R₁, where R and R₁ are alkyl, alkylol or alicyclic groups, or where R and R₁ together form an alkylene ring, substituted alkylene ring, or an alkylene ring interrupted by oxygen. These amines must also be free from interfering groups, such as carboxyl, nitrile, or aldehydo groups. Secondary amines which are particularly suitable for the formation of the more complex amines include morpholine, dimethylamine, methylethylamine, diethylamine, dipropylamine, piperidine, piperazine, diethanolamine, dibutylamine, diamylamine, dihexylamine, dioctylamine, didodecylamine, etc. As to the manufacture of secondary aliphatic amines of fairly high molecular weight, see U. S. Patent No. 2,078,922, to Arnold, dated May 4, 1937.

The aldehydes which may be employed in the manufacture of the complex phenolic alkylene amines may vary from low molecular weight aldehydes, such as formaldehyde, to aldehydes of high molecular weights, derived from fatty acids such as aleyl aldehyde, stearyl aldehyde, and the like. As to the manufacture of these aldehydes of high molecular weights derived from fatty acids of commerce, see U. S. Patent No. 2,033,539, to Ralston and Jackson, dated March 10, 1936. The aldehydes may be saturated or unsaturated and may be heterocylic and aromatic, as well as aliphatic. Benzaldehyde, crotonaldehyde, furfural, stearal, cinnamic aldehyde, etc., may be employed, as well as acetaldehyde, propionaldehyde, butyraldehyde, isobutyraldehyde, methylethyl acetaldehyde, valeraldehyde, trimethyl acetaldehyde, heptaldehyde, caprylic aldehyde ($C_8$), pelargonic aldehyde ($C_9$), margaric aldehyde, etc. Phenyacetaldehyde may also be employed.

The manufacture of the complex phenolic amines may be illustrated by the following examples:

*Example 1*

To a solution of 94 g. of phenol in 100 cc. of water containing 103 g. of diethanolamine, 100 g. of aqueous 30% formaldehyde are added while cooling and stirring. After 24 hours standing, the water is stirred off in vacuo, using a temperature of not over 25° C. A pale yellow viscous oil is obtained which is employed to neutralize dipropylated naphthalene sulfonic acid, so as to get a demulsifying agent of excellent quality.

*Example 2*

10 g. of acetaldehyde and 29 g. of dinormalbutyl amine are mixed and to this is added 25 g. of p-tertiary butyl phenol. The mixture is heated under reflux at 94° C. for three hours. After evaporating off volatile products on the steam plate, a clear, thin, reddish oil is obtained. This oil is insoluble in water, but soluble in benzol and kerosene. It combines with triisopropyl naphthalene sulfonic acid with evolution of heat to yield a dark, viscous oil which is only very slightly soluble in water, but soluble in benzol. This salt has a powerful demulsifying action on certain emulsions.

Example 3

19 g. of heptaldehyde and 17.5 g. of diethanolamine are mixed and to this is added 30 g. 95% ethanol and 25 g. of p-tertiarybutyl phenol. This mixture is placed under reflux at 77° C. for 18 hours. After evaporating off volatile material on the steam plate, 53 g. of a light yellow oil are obtained. This material is soluble in water. It combines with triisopropyl naphthalene sulfonic acid with evolution of heat to yield a viscous red oil soluble in benzol and having quite appreciable demulsifying action on certain emulsions.

The proportions of aldehyde and amine used should be at least one mole of each per mole of phenol. An excess of either or both the aldehyde and amine may also be employed. The desired condensation takes place only in basic or neutral solution, and in some cases the yield may be improved by adding small amounts of an alkali such as potassium hydroxide or sodium carbonate to the reaction mixture.

In some instances, it is desirable that the complex amine be produced by reacting a phenolic formaldehyde resin or its equivalent with additional formaldehyde, or some other aldehyde, and then reacting said components with a strongly basic, non-aromatic secondary amine in the manner previously described. Under such circumstances, at least one mole of a secondary amine and at least one mole of additional formaldehyde or the like should be used for each molecular equivalent of the phenolic formaldehyde resin or the like, which is employed as a raw material. As to procedure relating to the manufacture of this particular type of complex amine, reference is made to U. S. Patent No. 2,037,557, dated February 18, 1936, to Bruson.

For further information as to the manufacture of the complex phenolic alkylene amines, reference is made to U. S. Patent No. 2,033,092, to Bruson, dated March 3, 1936, and U. S. Patent No. 2,036,916, to Bruson, dated April 7, 1936.

For sake of convenience, I will refer to the complex phenolic amines as complex phenolic alkylene amine, because when derived from simpler saturated aldehydes, such as formaldehyde, there is present an alkylene radical acting as a link. However, when derived from some other type of aldehyde, there might be some radical other than the alkylene radical forming the linkage. An effort to include nomenclature of such scope as to include all the possible linkages might add to confusion rather than clarity. For this reason, the expression "alkylene" when used in connection with the term "complex phenolic alkylene amine" is to be used in a generic sense, as described.

I have discovered that if a suitable alkylated aromatic sulfonic acid, and particularly an alkylated naphthalene sulfonic acid having at least three carbon atoms in the alkyl group, is neutralized with a complex phenolic alkylene amine, one obtains a reagent of unusual effectiveness. There does not appear to be any suitable explanation of this unusual superiority, and similarly, there does not seen to be any basis by which one could anticipate or foresee this unusual effectiveness. Apparently, this marked improvement is not directly related to oil or water solubility, insofar that similar neutralization with other amines may yield compounds which have a greater solubility in oily materials or in water, and yet are not nearly as suitable and not nearly as effective in their demulsifying action.

Apparently, there is some unlooked-for co-operation or chemical or physical-chemical relationship between the complex phenolic alkylene amine residue and the sulfo-aromatic residue. The neutralization of other conventional acidic demulsifying reagents with complex phenolic alkylene amine does not seem to produce any marked improvement over the corresponding sodium or ammonium salts, and in many cases, yields an inferior product, thus indicating that apparently the increased value does not reside in an additive effect, due to the complex phenolic alkylene amine residue. Furthermore, the effectiveness of complex phenolic alkylene amine apparently is not enjoyed by various other amines which bear some similarity to this material, such as aniline, toluidine, propylamine, diamylamine, etc. In other words, if the same alkylated naphthalene sulfonic acids which are employed to produce the treating agent or demulsifying agent used in my process are neutralized with many other apparently kindred amines, one does not obtain a reagent that even begins to approach the effectiveness of the demulsifying agent used in my process. Similarly, if one neutralizes other sulfonic acids, which are known to be effective demulsifying agents, such as petroleum sulfonic acids of the mahogany acid type, with complex phenolic alkylene amine, one does not obtain a more effective demulsifying agent, and indeed, one is more likely to obtain a demulsifying agent which is less effective. Based on the results of actual tests obtained in a variety of emulsified crudes occurring in a number of the major oil fields of the United States, the conclusion one must inevitably reach is, that the result obtained by uniting the two residues, i. e., the complex phenolic alkylene amine residue, and the described sulfo-aromatic residue in a single molecule, results in an unlooked-for, unique quality, which could not be foreseen by the present knowledge of the art, and which produces a demulsifying agent that is particularly effective for a large number of emulsified crude oils.

Alkylated naphthalene sulfonic acids are produced commercially, and the salts are used for a variety of purposes. They are generally produced from naphthalene, because there does not appear to be any advantage in the use of a naphthalene derivative, such as chlor-naphthalene, alpha and beta naphthol, etc. In other words, one could introduce the sulfonic acid residue and the alkyl residues into a substituted naphthalene, such as chlor-naphthalene, etc., just as readily perhaps as in the case of naphthalene. However, such derivatives are more expensive and no advantage is obtained. Such simple derivatives, of course, are the chemical equivalent of naphthalene in the manufacture of such sulfonic acids as are employed in the manufacture of the present reagent. It is understood that the word "naphthalene" is hereinafter employed to include these derivatives, although, as pointed out, there is no advantage in using them, and the expense usually would be prohibitive.

The general process of manufacturing the demulsifying agent contemplated by my process, consists in converting the naphthalene into either the alpha or beta naphthalene sulfonic acid, or in some instances, into a di- or even tri-sulfonic acid. In most instances there is no advantage in introducing more than one sulfonic acid residue. In many instances it is unnecessary to use particular care to prepare either only the alpha sulfonic acid, or only the beta sulfonic acid, because a mixture in which either one or the other predominates, or a mixture in which the alpha and beta sulfonic acids are present in approximately equal amounts, is just as satisfactory as one sulfonic acid completely freed from the other type.

The alcohol employed, such as propyl alcohol, butyl alcohol, amyl alcohol, hexyl alcohol, decyl alcohol, etc., is converted into the acid sulfate, such as propyl hydrogen sulfate. The naphthalene sulfonic acid and the alkyl hydrogen sulfate are combined in proportions so that one, two, three, or even four alkyl groups are introduced into the aromatic residue. This condensation reaction is generally carried out in the presence of an excess of sulfuric acid. In some instances, the various reactions, such as sulfonation, sulfation, condensation, etc., are carried out simultaneously. Generally speaking, the dialkylated and trialkylated material appear to yield the most desirable type of reagent. The presence of some monoalkylated material, or some tetraalkylated material is not objectionable, and may even be desirable.

It is obvious, of course, that the alkylated groups introduced might be derived from olefines, such as butylene, propylene, amylene, etc., insofar that such olefines react directly with sulfuric acid, to produce the alkyl hydrogen sulfates. Of course, in addition to introducing such alkyl residues of the kind described into the aromatic nucleus, one could also introduce an alkyl residue from some other alcohol, as, for example, an alkylated group derived from ethyl or methyl alcohol, or one might introduce a group derived from an aryl, aralkyl, or cyclo-alcohol, but regardless of whether or not one introduces such other residues, it is necessary that at least one alkyl residue of the kind described, i. e., having at least three carbon atoms and not more than ten carbon atoms, be introduced into the naphthalene ring. Such compounds having some other residue present, such as a methyl residue, might be considered as being derived from methyl naphthalene, instead of naphthalene, and thus, would fall within the class of chemical equivalents previously noted. It is immaterial as to the particular alcohol employed, or the particular isomeric form of the alcohol employed, although generally speaking, it is most desirable to use the one lowest in cost. It is immaterial whether one uses normal propyl alcohol or isopropyl alcohol. It is immaterial whether one uses a normal butyl or isobutyl alcohol. It is immaterial whether the alcohol be a primary alcohol, or a secondary alcohol, or a tertiary alcohol, or the like.

It is obvious that a large number of isomers can be produced in the manufacture of the reagent employed in the present process. For instance, although the sulfonic group may be introduced into either the alpha or beta position, it is manifest that the alkyl group or groups can be introduced into various positions in regard to the position of the sulfonic acid residue. Apparently, as far as I am aware, one isomeric form is as effective as the other. Reference to the compounds is not intended to indicate any particular isomer, unless the text clearly indicates some specific position.

Insofar that the most readily available alcohols, from the standpoint of cost, are isopropyl alcohol, normal butyl alcohol, isobutyl alcohol, and amyl alcohol, it is my preference to produce my reagents from these alcohols, and in some instances, it is desirable to introduce different alkyl groups, such as a propyl group and butyl group into the same sulfo-naphthalene residue.

In the actual manufacture of alkylated naphthalene sulfonic acids, the completion of the desired chemical reactions is followed by a washing process, which removes the excess of sulfuric acid or other sulfonation, sulfation, or condensation reagent employed. The acidic mass thus obtained is neutralized with complex phenolic alkylene amine in the same manner that sodium or potassium or ammonium hydroxides might usually be employed. The final product, if it represents a pasty or semi-solid or a solid mass, is rendered suitable for industrial use by the addition of a solvent, such as water, an alcohol, a coal tar solvent, a petroleum hydrocarbon solvent, or in any similar manner.

The demulsifying agent that I prefer to use in practicing my process is obtained by a reaction in which three moles of isopropyl alcohol are united with one mole of naphthalene by the customary sulfation, sulfonation and condensation reactions. The resulting mixture consists largely of dipropyl naphthalene sulfonic acids and tripropyl naphthalene sulfonic acids, with possibly small amounts of monopropyl sulfonic acids and tetrapropyl sulfonic acids present. Generally speaking, it is easier to conduct the reaction so that the bulk of the sulfonic acid represents the beta type, although the alpha type may be produced, if desired. The neutralized product is diluted with one or more solvents, so as to reduce its viscosity to that of ordinary castor oil, or slightly greater. The solvents which I preferably employ are a mixture of two or more of the following: Water, denatured alcohol, kerosene, or tar acid oil.

Among the reagents which are particularly effective are the complex phenolic alkylene amine salts of the following alkylated naphthalene sulfonic acids, i. e., monoisopropyl naphthalene sulfonic acid, diisopropyl naphthalene sulfonic acid, triisopropyl naphthalene sulfonic acid, mononormal butyl naphthalene sulfonic acid, dinormal butyl naphthalene sulfonic acid, monoisobutyl naphthalene sulfonic acid, diisobutyl naphthalene sulfonic acid, diamyl naphthalene sulfonic acid, triamyl naphthalene sulfonic acid, monohexyl naphthalene sulfonic acid, dihexyl naphthalene sulfonic acid, trihexyl naphthalene sulfonic acid, mono-octyl naphthalene sulfonic acid, dioctyl naphthalene sulfonic acid, monodecyl naphthalene sulfonic acid, didecyl naphthalene sulfonic acid, monoisopropyl dinormal butyl naphthalene sulfonic acid, diisopropyl, monoamyl naphthalene sulfonic acid, monoisopropyl, monohexyl naphthalene sulfonic acid, etc.

It may be desirable to indicate that there is sometimes some variation in nomenclature in regard to the salts derived from strong acids and various amines. For instance, the combination of aniline and hydrochloric acid, is often referred to as aniline hydrochloride. When aniline hydrochloride is treated with caustic soda, aniline is regenerated and sodium chloride formed. For this reason, and perhaps for other reasons, structural conditions are best expressed by referring to the compound as a hydrochloride, in order to indicate that one does not obtain the chloride of a quaternary ammonium compound. Similarly, the reaction of complex phenolic alkylene amine with a sulfonic acid may be considered as producing the complex phenolic alkylene amine salt, although for reasons pointed out, such salt might be looked upon as a complex phenolic alkylene amine hydrogen sulfonate, as well as being considered as a complex phenolic alkylene amine sulfonate. Insofar that it is perfectly clear as to the chemical composition of the compound, it is immaterial which nomenclature is employed.

In such instances where there is present more than one sulfonic acid residue, as in the formation of a disulfonic acid, or a trisulfonic acid, if desired, all the sulfonic acid hydrogen may be neutralized with complex phenolic alkylene amine, or if desired, only one sulfonic hydrogen may be neutralized with complex phenolic alkylene amine, and the other sulfonic hydrogen atom or atoms may be neutralized with some other suitable base, such as sodium hydroxide, potassium hydroxide, ammonium hydroxide, etc.

Complex phenolic alkylene amine salts, such as the hydrochloride, may react by double decomposition with alkali salt sulfonates in a suitable medium to produce the complex phenolic alkylene amine sulfonate.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc. may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, in which the sulfonic hydrogen is neutralized by the use of some base other than complex phenolic alkylene amine.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000, or 1 to 20,000, or even 1 to 30,000, such an apparent insolubility in oil and water is not significant because said reagents undoubtedly have solubility within the concentration employed. This same fact is true in regard to the material or materials employed as the demulsifying agent of my process.

Having thus described my invention, what I claim as new and desire to secure by Letters Patent is:

1. A process for breaking petroleum emulsions of the water-in-oil type, which consists in subjecting the emulsion to the action of a demulsifying agent comprising a salt of the kind derived by reaction between an alkylated aromatic sulfonic acid and a complex amine; said complex amine being derived by reaction between an aldehyde having not over 22 carbon atoms, a strongly basic, non-aromatic secondary amine having not over 44 carbon atoms and free from carboxyl, nitrile, and aldehydo groups, and a phenol of the type X—R—OH, where R is an aromatic nucleus having at least one free nuclear position, ortho or para, to the phenolic hydroxyl available for condensation, or an equivalent position, if in a polycyclic nucleus; and X is a hydrogen atom or a nuclear substituent of R and consisting of a monovalent hydrocarbon radical; and R is additionally characterized by the fact that other substituents selected from the class consisting of halogen atoms, alkyl, alkoxy, nitro, amino, and alkylol radicals, may be present, but R must be free from acidic or acid-forming constituents selected from the class of sulfonic, aldehydo or carboxyl radicals.

2. A process for breaking petroleum emulsions of the water-in-oil type, which consists in subjecting the emulsion to the action of a demulsifying agent comprising a salt of the kind derived by reaction between an alkylated aromatic sulfonic acid and a complex amine; said complex amine being derived by reaction between a saturated aldehyde having not over 22 carbon atoms, a strongly basic non-aromatic secondary amine having not over 44 carbon atoms, and free from carboxyl, nitrile, and aldehydo groups, and a phenol of the type X—R—OH, where R is an aromatic nucleus having at least one free nuclear position, ortho or para, to the phenolic hydroxyl available for condensation, or an equivalent position, if in a polycyclic nucleus; and X is a hydrogen atom or a nuclear substituent of R and consisting of a monovalent hydrocarbon radical; and R is additionally characterized by the fact that other substituents selected from the class consisting of halogen atoms, alkyl, alkoxy, nitro, amino, and alkylol radicals, may be present, but R must be free from acidic or acid-forming constituents selected from the class of sulfonic, aldehydo or carboxyl radicals.

3. A process for breaking petroleum emulsions of the water-in-oil type, which consists in subjecting the emulsion to the action of a demulsifying agent comprising a salt of the kind derived by reaction between an alkylated aromatic sulfonic acid and a complex amine; said complex amine being derived by reaction between a saturated aldehyde having not over 22 carbon atoms, a strongly basic non-aromatic secondary amine having not over 44 carbon atoms, and free from carboxyl, nitrile, and aldehydo groups, and a phenol of the type X—R—OH, where R is an aromatic monocyclic nucleus having at least one free nuclear position, ortho or para, to the phenolic hydroxyl available for condensation, and X is a hydrogen atom or a nuclear substituent of R and consisting of a monovalent hydrocarbon radical; and R is additionally characterized by the fact that other substituents selected from the class consisting of halogen atoms, alkyl, alkoxy, nitro, amino, and alkylol radicals, may be present, but R must be free from acidic or acid-forming constituents selected from the class of sulfonic, aldehydo or carboxyl radicals.

4. A process for breaking petroleum emulsions of the water-in-oil type, which consists in subjecting the emulsion to the action of a demulsifying agent comprising a salt of the kind derived by reaction between an alkylated aromatic sulfonic acid and a complex amine; said complex amine being derived by reaction between a saturated aldehyde having not over 22 carbon atoms, a strongly basic non-aromatic secondary amine having not over 44 carbon atoms, and free from carboxyl, nitrile, and aldehydo groups, and a phenol of the type X—R—OH, where R is an aromatic monocyclic nucleus having at least one free nuclear position, ortho or para, to the phenolic hydroxyl available for condensation, and X is a hydrogen atom or a nuclear substituent of R and consisting of a monovalent hydrocarbon radical containing at least 6 carbon atoms; and R is additionally characterized by the fact that other substituents selected from the class consisting of halogen atoms, alkyl, alkoxy, nitro, amino and alkylol radicals, may be present, but R must be free from acidic or acid-forming constituents selected from the class of sulfonic aldehydo or carboxyl radicals.

5. A process for breaking petroleum emulsions of the water-in-oil type, which consists in subjecting the emulsion to the action of a demulsifying agent comprising a salt of the kind derived by reaction between an alkylated aromatic polycyclic sulfonic acid and a complex amine; said complex amine being derived by reaction between a saturated aldehyde having not over 22 carbon atoms, a strongly basic non-aromatic secondary amine having not over 44 carbon atoms, and free from carboxyl, nitrile, and aldehydo groups, and a phenol of the type X—R—OH, where R is an aromatic monocyclic nucleus having at least one free nuclear position, ortho or para, to the phenolic hydroxyl available for condensation, and X is a hydrogen atom or a nuclear substituent of R and consisting of a monovalent hydrocarbon radical containing at least 6 carbon atoms; and R is additionally characterized by the fact that other substituents selected from the class consisting of halogen atoms, alkyl, alkoxy, nitro, amino, and alkylol radicals, may be present, but R must be free from acidic or acid-forming constituents selected from the class of sulfonic, aldehydo or carboxylic radicals.

6. A process for breaking petroleum emulsions of the water-in-oil type, which consists in subjecting the emulsion to the action of a demulsifying agent comprising a salt of the kind derived by reaction between an alkylated aromatic polycyclic sulfonic acid derived from naphthalene and a complex amine; said complex amine being derived by reaction between a saturated aldehyde having not over 22 carbon atoms, a strongly basic non-aromatic secondary amine having not over 44 carbon atoms, and free from carboxyl, nitrile, and aldehydo groups, and a phenol of the type X—R—OH, where R is an aromatic monocyclic nucleus having at least one free nuclear position, ortho or para, to the phenolic hydroxyl available for condensation; and X is a hydrogen atom or a nuclear substituent of R and consisting of a monovalent hydrocarbon radical containing at least 6 carbon atoms; and R is additionally characterized by the fact that other substituents selected from the class consisting of halogen atoms, alkyl, alkoxy, nitro, amino, and alkylol radicals, may be present, but R must be free from acidic or acid-forming constituents selected from the class of sulfonic, aldehydo or carboxyl radicals.

7. A process for breaking petroleum emulsions of the water-in-oil type, which consists in subjecting the emulsion to the action of a demulsifying agent comprising a salt of the kind derived by reaction between an alkylated aromatic polycyclic sulfonic acid derived from naphthalene, and characterized by the fact that the alkyl radical introduced into the naphthalene nucleus contains at least 3 carbon atoms and not more than 10 carbon atoms, and a complex amine; said complex amine being derived by reaction between a saturated aldehyde having not over 22 carbon atoms, a strongly basic non-aromatic secondary amine having not over 44 carbon atoms, and free from carboxyl, nitrile, and aldehydo groups, and a phenol of the type X—R—OH, where R is an aromatic monocyclic nucleus having at least one free nuclear position, ortho or para, to the phenolic hydroxyl available for condensation; and X is a hydrogen atom or a nuclear substituent of R and consisting of a monovalent hydrocarbon radical containing at least 6 carbon atoms; and R is additionally characterized by the fact that other substituents selected from the class consisting of halogen atoms, alkyl, alkoxy, nitro, amino, and alkylol radicals, may be present, but R must be free from acidic or acid-forming constituents selected from the class of sulfonic, aldehydo or carboxyl radicals.

8. A process for breaking petroleum emulsions of the water-in-oil type, which consists in subjecting the emulsion to the action of a demulsifying agent comprising a salt of the kind derived by reaction between an alkylated aromatic polycyclic sulfonic acid derived from naphthalene, and characterized by the fact that the alkyl radical introduced into the naphthalene nucleus contains at least 3 carbon atoms and not more than 10 carbon atoms, and a complex amine; said complex amine being derived by reaction between a saturated aldehyde having not over 22 carbon atoms, a strongly basic non-aromatic secondary amine having not over 44 carbon atoms, and free from carboxyl, nitrile, and aldehydo groups, and a phenol of the type X—R—OH, where R is an aromatic monocyclic nucleus having at least one free nuclear position, ortho or para, to the phenolic hydroxyl available for condensation; and X is a hydrogen atom or a nuclear substituent of R and consisting of an alkyl radical containing at least 6 carbon atoms; and R is additionally characterized by the fact that other substituents selected from the class consisting of halogen atoms, alkyl, alkoxy, nitro, amino, and alkylol radicals, may be present, but R must be free from acidic or acid-forming constituents selected from the class of sulfonic, aldehydo or carboxyl radicals.

9. A process for breaking petroleum emulsions of the water-in-oil type, which consists in subjecting the emulsion to the action of a demulsifying agent comprising a salt of the kind derived by reaction between an alkylated aromatic polycyclic sulfonic acid derived from naphthalene, and characterized by the fact that the alkyl radical introduced into the naphthalene nucleus contains at least 3 carbon atoms and not more than 10 carbon atoms, and a complex amine; said complex amine being derived by reaction, in the equivalent molecular proportion of 1:1:1, between a saturated aldehyde having not over 22 carbon atoms, a strongly basic non-aromatic secondary amine having not over 44 carbon atoms, and free from carboxyl, nitrile, and aldehydo groups, and a phenol of the type X—R—OH, where R is an aromatic monocyclic nucleus having at least one free nuclear position, ortho, or para, to the phenolic hydroxyl available for condensation; and X is a hydrogen atom or a nuclear substituent of R and consisting of an alkyl radical containing at least 6 carbon atoms; and R is additionally characterized by the fact that other substituents selected from the class consisting of halogen atoms, alkyl, alkoxy, nitro, amino, and alkylol radicals, may be present, but R must be free from acidic or acid-forming constituents selected from the class of sulfonic, aldehydic or carboxyl radicals.

10. A process for breaking petroleum emulsions of the water-in-oil type, which consists in subjecting the emulsion to the action of a demulsifying agent comprising a salt of the kind derived by reaction between an alkylated aromatic polycyclic sulfonic acid derived from naphthalene, and characterized by the fact that the alkyl radical introduced into the naphthalene nucleus contains at least 3 carbon atoms and not more than 10 carbon atoms, and a complex amine; said complex amine being derived by reaction, in the equivalent molecular proportion of 1:1:1, between a saturated aldehyde having not over 22 carbon atoms, a strongly basic non-aromatic secondary amine of the aliphatic type, having not over 44 carbon atoms, and free from carboxyl, nitrile, and aldehydo groups, and a phenol of the type X—R—OH, where R is an aromatic monocyclic nucleus having at least one free nuclear position, ortho or para, to the phenolic hydroxyl available for condensation; and X is a hydrogen atom or a nuclear substituent of R and consisting of an alkyl radical containing at least 6 carbon atoms; and R is additionally characterized by the fact that other substituents selected from the class consisting of halogen atoms, alkyl, alkoxy, nitro, amino, and alkylol radicals, may be present, but R must be free from acidic or acid-forming constituents selected from the class of sulfonic, aldehydo or carboxyl radicals.

11. A process for breaking petroleum emulsions of the water-in-oil type, which consists in subjecting the emulsion to the action of a demulsifying agent comprising a salt of the kind derived by reaction between an alkylated aromatic polycyclic sulfonic acid derived from naphthalene, and characterized by the fact that the alkyl radical introduced into the naphthalene nucleus contains at least 3 carbon atoms and not more than 10 carbon atoms, and a complex amine being derived by reaction, in the equivalent molecular proportion 1:1:1 between formaldehyde, diethanolamine, and a phenol of the type X—R—OH, where R is an aromatic monocyclic nucleus having at least one free nuclear position, ortho or para, to the phenolic hydroxyl available for condensation; and X is a hydrogen atom or a nuclear substituent of R and consisting of an alkyl radical containing at least 6 carbon atoms; and R is additionally characterized by the fact that other substituents selected from the class consisting of halogen atoms, alkyl, alkoxy, nitro, amino, and alkylol radicals, may be present, but R must be free from acidic or acid-forming constituents selected from the class of sulfonic, aldehydo or carboxyl radicals.

12. A process for breaking petroleum emulsions of the water-in-oil type, which consists in subjecting the emulsion to the action of a demulsifying agent comprising a chemical compound of the formula type:

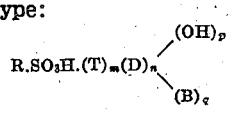

where R is an alkylated aromatic nucleus, T is a phenolic residue, D is an aldehydo linkage, and B is a monovalent secondary amino radical, $m$ is a small whole number such as 1, 2, 3, 4 or 5, and less than 10; $n$ is a whole number having any value from $m$ to $m+10$; $p$ may be zero or any whole number up to and including $(n-m)$; $q$ may be any whole number from 1 up to and including $(n-m+1)$, with the provision that in all instances the sum of $p$ and $q$ must total $(n-m+1)$.

13. A process for breaking petroleum emulsions of the water-in-oil type, which consists in subjecting the emulsion to the action of a demulsifying agent comprising a chemical compound of the formula type:

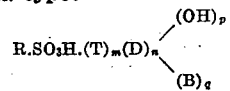

where R is an alkylated aromatic nucleus, T is a phenolic residue, D is an aldehydo linkage derived from a saturated aldehyde, and B is a monovalent secondary amino radical, $m$ is a small whole number such as 1, 2, 3, 4 or 5, and less than 10; $n$ is a whole number having any value from $m$ to $m+10$; $p$ may be zero or any whole number up to and including $(n-m)$; $q$ may be any whole number from 1 up to and including $(n-m+1)$, with the provision that in all instances the sum of $p$ and $q$ must total $(n-m+1)$.

14. A process for breaking petroleum emulsions of the water-in-oil type, which consists in subjecting the emulsion to the action of a demulsifying agent comprising a chemical compound of the formula type:

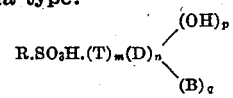

where R is an alkylated polycyclic aromatic nucleus, T is a phenolic residue, D is an aldehydo linkage derived from a saturated aldehyde, and B is a monovalent secondary amino radical, $m$ is a small whole number such as 1, 2, 3, 4 or 5, and less than 10; $n$ is a whole number having any value from $m$ to $m+10$; $p$ may be zero or any whole number up to and including $(n-m)$; $q$ may be any whole number from 1 up to and including $(n-m+1)$, with the provision that in all instances the sum of $p$ and $q$ must total $(n-m+1)$.

15. A process for breaking petroleum emulsions of the water-in-oil type, which consists in subjecting the emulsion to the action of a demulsifying agent comprising a chemical compound of the formula type:

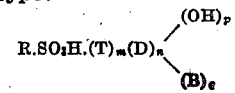

where R is an alkylated naphthalene nucleus, T is a phenolic residue, D is an aldehydo linkage derived from a saturated aldehyde, and B is a monovalent secondary amino radical, $m$ is a small whole number such as 1, 2, 3, 4 or 5, and less than 10; $n$ is a whole number having any value from $m$ to $m+10$; $p$ may be zero or any whole number up to and including $(n-m)$; $q$ may be any whole number from 1 up to and including $(n-m+1)$, with the provision that in all instances the sum of $p$ and $q$ must total $(n-m+1)$.

16. A process for breaking petroleum emulsions of the water-in-oil type, which consists in subjecting the emulsion to the action of a demulsifying agent comprising a chemical compound of the formula type:

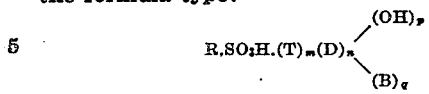

where R is an alkylated naphthalene nucleus, characterized by the fact that the alkyl radicals contain at least 3 carbon atoms and not more than 10, T is a phenolic residue, D is an aldehydo linkage derived from a saturated aldehyde, and B is a monovalent secondary amino radical, $m$ is a small whole number such as 1, 2, 3, 4 or 5, and less than 10; $n$ is a whole number having any value from $m$ to $m+10$; $p$ may be zero or any whole number up to and including $(n-m)$; $q$ may be any whole number from 1 up to and including $(n-m+1)$, with the provision that in all instances the sum of $p$ and $q$ must total $(n-m+1)$.

CHARLES M. BLAIR.